United States Patent [19]

Matsumura et al.

[11] Patent Number: 5,199,019
[45] Date of Patent: Mar. 30, 1993

[54] DIGITAL SIGNAL INFORMATION REPRODUCTION APPARATUS ENABLING RECORDING MEDIUM SUBSITUTION DURING REPRODUCTION OF A PRIOR RECORDING MEDIUM

[75] Inventors: Asayuki Matsumura; Masayoshi Nakamura, both of Hirakata, Japan

[73] Assignee: Matsushita Electric Industrial Co., Ltd., Osaka, Japan

[21] Appl. No.: 543,543

[22] Filed: Jun. 26, 1990

[30] Foreign Application Priority Data

Jun. 30, 1989 [JP] Japan .................................. 1-170201

[51] Int. Cl.⁵ ........................ H04N 5/76; G11B 15/46
[52] U.S. Cl. ..................................... 369/60; 360/73.03
[58] Field of Search .................. 369/60, 47, 44.32, 32, 369/124, 44.33; 360/73.03, 73.06

[56] References Cited
U.S. PATENT DOCUMENTS 4,603,412  7/1986  Yamazaki .............................. 369/50
4,796,247  1/1989  Vogelsang ............................. 369/44

Primary Examiner—Aristotelis Psitos
Assistant Examiner—Won Tae C. Kim
Attorney, Agent, or Firm—Stevens, Davis, Miller & Mosher

[57] ABSTRACT

In a digital signal information reproduction apparatus such as a compact disk player and digital audio tape deck, the digital information recorded on a disk is read therefrom at a speed higher than usual during a predetermined period from its start, the read information is stored in a memory such as a RAM, and the information stored in the memory is read at the usual speed for playing. The information has been read from the disk during a period shorter thant the period required for the playing so that the extra time provided after completion of reading the information from the disk can be efficiently used for exchange of the compact disk or the digital audio tape. This realizes continuous playing of pieces of music.

5 Claims, 4 Drawing Sheets $S_1 = 1.2 \sim 1.4$ m/s

DIGITAL SIGNAL INFORMATION REPRODUCTION APPARATUS ENABLING RECORDING MEDIUM SUBSITUTION DURING REPRODUCTION OF A PRIOR RECORDING MEDIUM

BACKGROUND OF THE INVENTION

The present invention relates to an apparatus for reproducing digital signal information in a compact disk player, digital audio tape deck, etc.

The tremendous supply of digital audio apparatus such as a compact disk player in markets in recent years has permitted easy amusement by general users.

The conventional digital audio apparatus will be explained in an example of a compact disk player.

FIG. 4 is a block diagram of the compact disk player. Using this figure, brief explanation will be given for general flow of digital signals. Rotating a spindle motor 1 rotates a disk 2; then an optical pickup 3, arranged near the disk 2, reads digital signals recorded on the disk 2. One of them, referred as an RF signal, is sent to an analog waveform signal shaping block 4, while the other of them, referred to as a servo signal, is sent to a servo signal block 5. The servo signal contributes to good continuous reading of pits of data engraved on the disk 2. The RF signal, passed through the analog signal shaping block 4, changes into a pulse train waveform in accordance with the information recorded on disk 2, which is converted into an impulse waveform by a PLL circuit block 6. The impulse waveform is a pulse train waveform corresponding to a clock frequency owing to correlation with a synchronous detection circuit block 7; this pulse train waveform is sent to a digital signal processing block 8. The clock frequency generally determined is actually 4,3218 MHz; it is now assumed to be fi·Hz for convenience of explanation.

The data subjected to digital processing by the digital signal processing circuit block 8 is once stored in a RAM block 9, and thereafter it is returned to the digital signal processing circuit block 8 in synchronism with a clock pulse offered by a quartz oscillator therein. The resultant data is supplied to a D/A converter circuit block 10 for its D-A conversion. The analog signal thus formed is outputted as a left (L) channel signal and a right (R) channel signal.

The RAM 9 generally has a large capacity of 16K bits. Data is inputted or outputted from the RAM 9 at a very high speed; the signal (data) is once stored in the RAM 9 and thereafter read out instantaneously therefrom. This contributes to reducing the delay time, i.e. the time from when the optical pickup starts to read the signal on the disk 2 to when the read signal is outputted as an analog signal.

FIGS. 5A, 5B and 5C show time changes in numerical values of main concepts in the prior art. In the abscissa, the time '0' represents a disk play starting time and the data read start time. Time 't3' represents a disk play ending time and the data output completion time. It should be noted that time 0 also constitutes the start time of disk reproduction (i.e., reading of data from the disk) and the data store start time (in RAM 9) as these terms are used herein.

FIG. 5A illustrates time changes in RAM capacity. The ordinate represents the amount of data actually stored in the RAM 9; N1 corresponds to bits of ten thousand and several thousands. Strictly speaking, a time lag occurs from the time '0' to the time when N1 is reached; this time lag can be disregarded since it is 0.01 sec or less. The time delay from start of read of data to production of analog signals (actual sound production), which actually occurs, can be also disregarded since it is very short. N1, illustrated constant from the time '0' to 't3', actually changes continuously when viewed in a small scale; it is illustrated as shown in FIG. 5A since it is averagely constant.

FIG. 5B shows time changes in the clock frequency in the PLL circuit block 6. The clock frequency remains constant f1 from the time '0' to 't3'. The clock frequency in reading out the data once stored in the RAM 9 as mentioned above is set to be equal to the above clock frequency in the PLL circuit block 6. Therefore, a predetermined amount of data is continuously stored in or read from the RAM 9.

FIG. 5C shows time changes in the linear speed of the disk at the position of the optical pick-up. This linear speed is equal to the speed of reading the data on the disk. In the case of a compact disk player, this linear speed S1 is set to be 1.2–1.4 m/s. Namely, the linear speed S1 is constant from the time '0' to 't3'. This was the feature of the compact disk player.

The above arrangement in which the disk playback time means a playing time as it is has the following drawback. It takes a time to start the playback of another disk after having enjoyed a piece of music, etc. Specifically, extraction of one disk from the spindle motor and setting of another disk requires a loading mechanism, so that actual exchange of disks takes at least ten and several seconds.

SUMMARY OF THE INVENTION

An object of the invention is to provide a digital signal information reproduction apparatus which permits users to continuously enjoy play without time loss by exchanging disks within the present playing.

In order to attain the above object, the digital signal reproduction apparatus according to the present invention comprises a large capacity of RAM as a memory for storage for a predetermined time and a read-out PLL circuit in which the clock frequency is made variable.

The present invention, through the above arrangement, can read the data on the disk at a higher speed than the prior art by a predetermined time, which shortens the disk reproduction time correspondingly. This permits the disks to be exchanged until completion of the present playing, thereby preparing start of another playing; the user, therefore, can enjoy another playing with no time loss.

DESCRIPTION OF THE PREFERRED EMBODIMENTS

Figure 1:
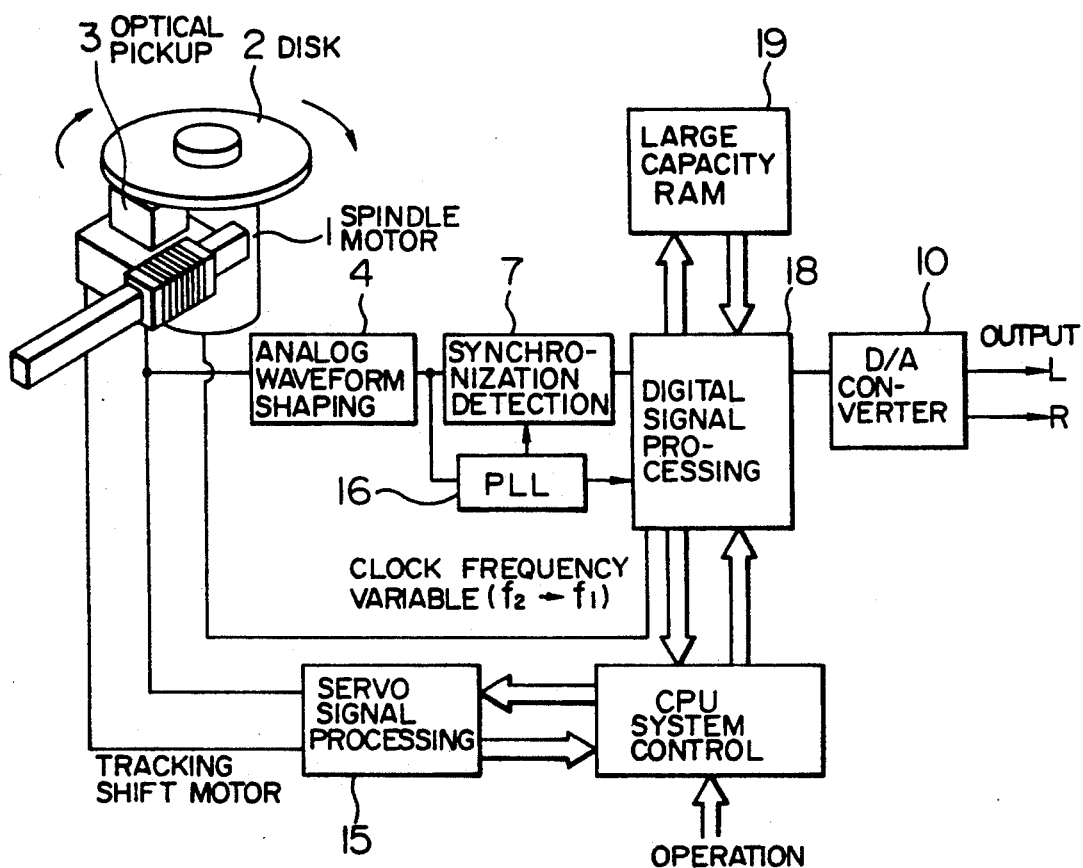
FIG. 1 is a block diagram of the compact disk player according to one embodiment of the present invention.

Now referring to the drawings, explanation will be given for the digital signal reproduction apparatus according to one embodiment of the present invention.

Figure 4:
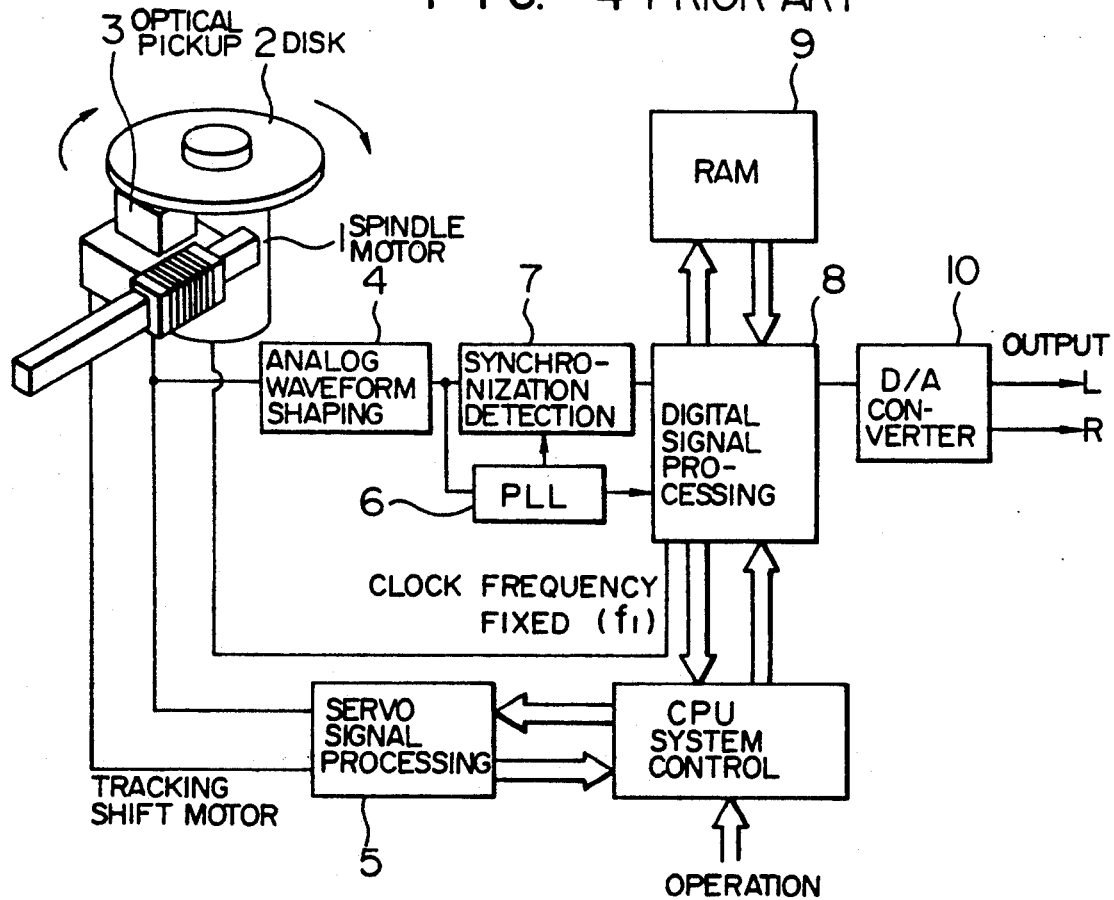
FIG. 4 is a block diagram of the prior art compact disk player.
Figure 5A:
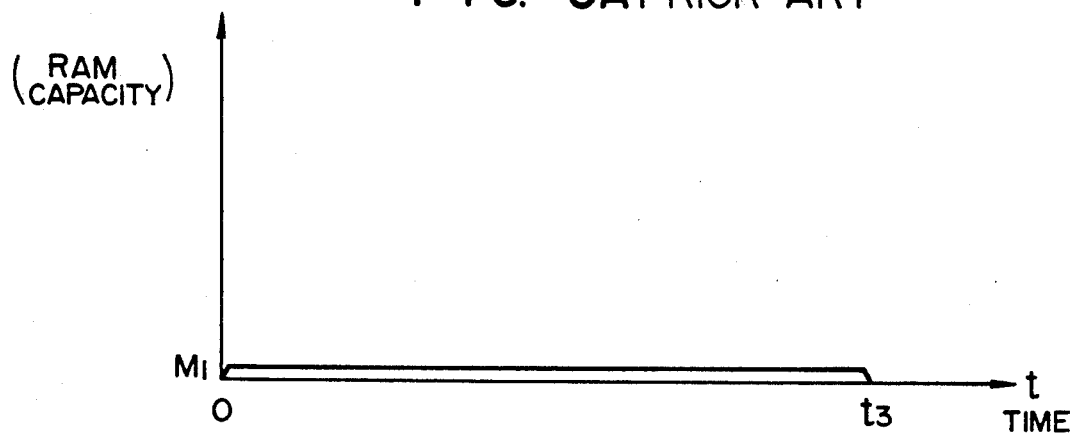
FIGS. 5A, 5B and 5C are time charts of the amount of storage in RAM in the prior art, of the clock frequency in a PLL circuit therein, and of the linear speed of a disk therein, respectively.
Figure 5B:
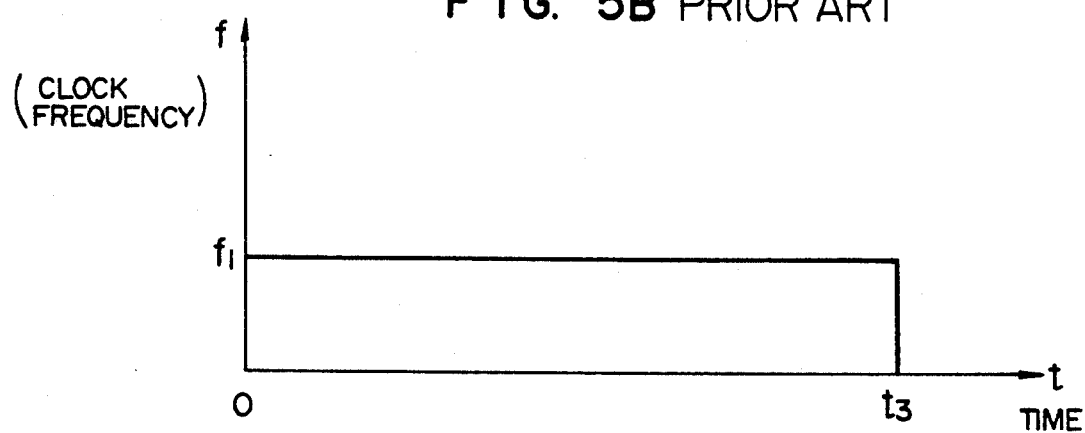
Figure 5C:
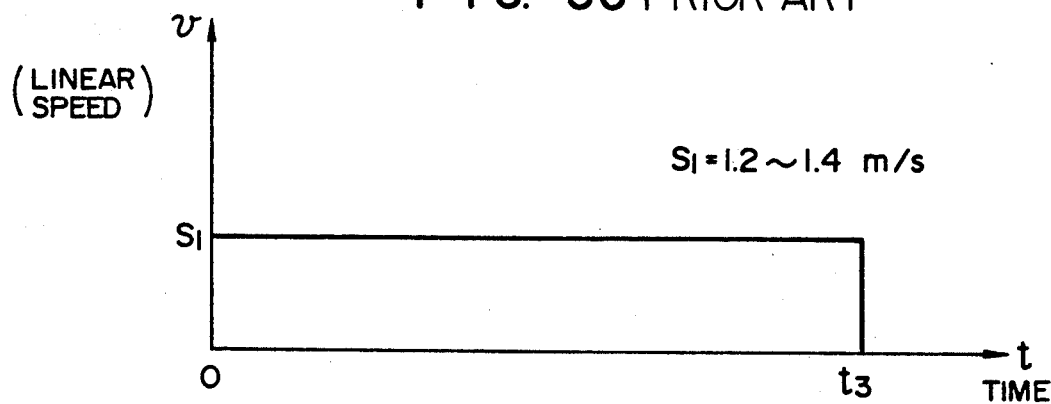

FIG. 1 is a block diagram of the digital signal reproduction apparatus (compact disk player) according to one embodiment of the present invention. The components having the same functions as those of the components in the prior art of FIG. 4 will now be explained here.

The compact disk player according to this embodiment is different from the prior art in a RAM 19, a PLL circuit block 16, a servo signal processing circuit 15, etc.

In this embodiment, the disk 2 is rotated for the time up to 't1' elapsed from start of its reproduction at time 0 at the linear speed S2 of a disk at the position of an optical pickup. S2 which is much larger than speed S1 at which the disk is rotated during a comparable time period in the prior art. Disk 2 is rotated at the usual linear speed, i.e. S1, for the time from 't1' to the data read ending time 't2'. Then, the digital signal processing circuit block 18 issues an instruction, but the RF signal as data will also vary. Therefore, the clock frequency in the PLL circuit block 18 must be also varied; it is set for f2 set, during the time from start of disk reproduction to t1, and which is thereafter changed to f1.

A much larger amount of data than usual is read during the time up to 't1' so that the RAM 19 is required to have a much larger capacity as a memory than in the prior art. Additionally, the data is read from the RAM 19 at a given speed from start of reproduction of the disk at time 0.

Figure 2A:
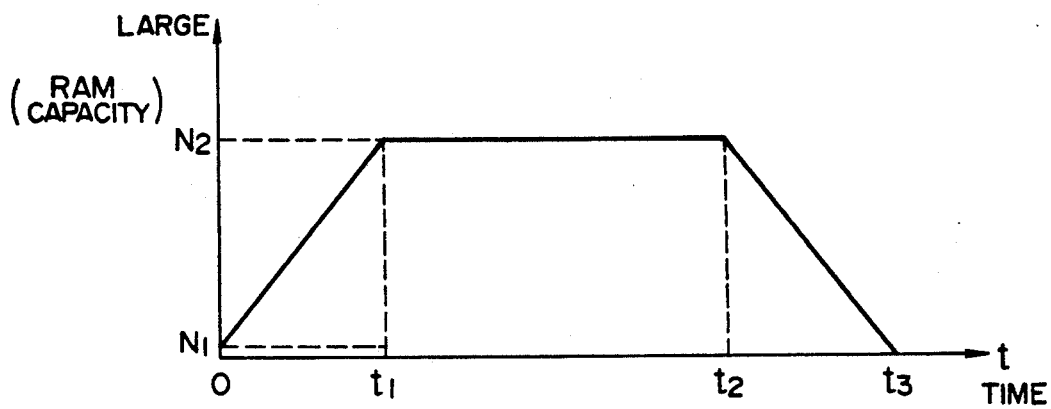
FIGS. 2A, 2B and 2C are time charts of the amount of storage in RAM in the embodiment of FIG. 1, of the clock frequency in a PLL circuit therein, and of the linear speed of a disk therein, respectively.
Figure 2B:
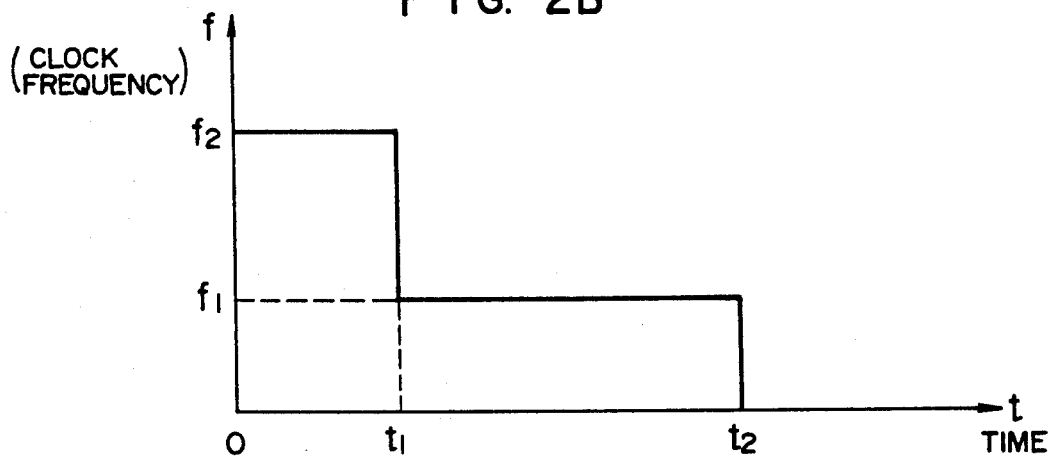
Figure 2C:
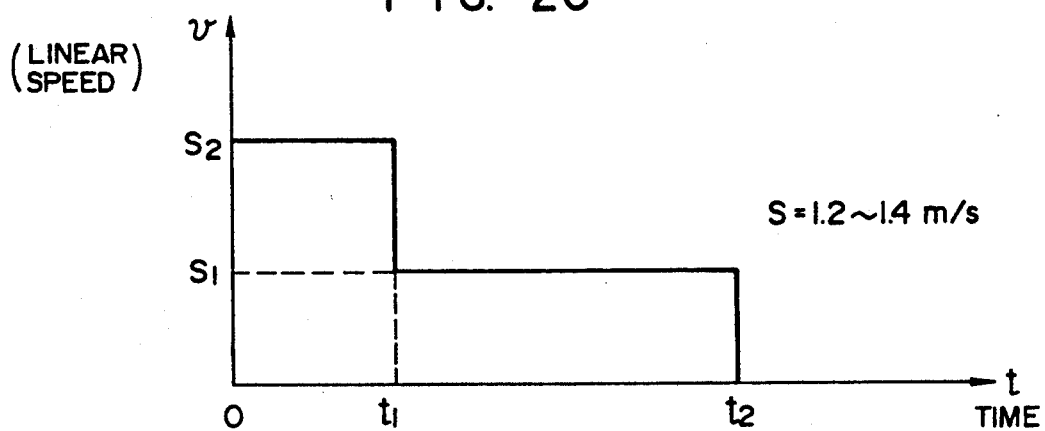

FIGS. 2A, 2B and 2C show time changes of the numerical factors of these components. FIG. 2A shows the time change in the RAM storage amount (number of bits) in this embodiment. N2 (bits) are much larger than N1 adopted in the prior art. For example, the number of bits N required to store the data corresponding to the playing time of 30 sec. can be expressed by $$N = n \times M \times F \times 30 \text{ sec.}$$
$$= 2 \times 16 \times 44.1 \times 10^3 \times 30$$
$$= 42.3 \times 10^6 \text{ bits}$$
$$= 42.3 \text{ M bits}$$

where F is a sampling frequency (44.1 KHz), M is the number of bits at one channel (16), and n is the number of channels (2). This storage amount is much larger than that of the prior art RAM.

As seen from FIG. 2A, the RAM storage amount has already become N1 at the time 0 which represents the start time of disk reproduction. Actually, it takes a slight time to store the data of N1 bits in the RAM from start of disk reproduction; the data of N1 bits, however, are almost instantaneously stored so that this time has been disregarded as negligible. Also, the data of N1 bits represent the minimum amount when reading of the data as signals is started.

During the period up to time 't1', a much larger amount of data than that read from the RAM 19 is read from the disk 2 and stored in the RAM 19; therefore, the amount of data stored in the RAM 19 increases with passage of time, and it reaches N2.

After the time 't1', the rotation speed of the disk 2 is reduced to the normal speed S1; therefore, during the period from time t1 to time t2, the amount of data stored in the RAM 19 is equal to that read therefrom. Thus, during the period from time 't1' to 't2', the amount of data stored in the RAM 19 remains N2.

At time 't2' data, reproduction from the disk 2 is terminated; in other words, the data are no longer read from the disk 2 so. As a result after time t2, the data stored in the RAM 19 will be only read. Thus, the amount of data stored in the RAM 19 decreases with passage of time to become zero at time 't3'. Namely, the playing operation is terminated and data output is completed.

FIG. 2B shows the time change in the clock frequency in the PLL block 16 during the disk reproduction. As described above, during the period from time 't0' to 't1', the rotary speed is S2 higher than the normal speed S1 so that the clock frequency is 'f2' correspondingly; during the period from m time 't1' to time 't2', the rotation speed of the disk is reduced to the normal speed so that the clock frequency is correspondingly reduced to 'f1'.

FIG. 2C shows the time change in the linear speed of the disk 2 at the position of the optical pickup 3 during the disk reproduction from time 0 to time t2. As described above, during the period from time '0' to 't1', the rotary speed is higher than the normal speed so that the linear speed is 'S2' correspondingly; during the period from time 't1' to time 't2', the rotation speed of the disk is reduced to the normal speed so that the linear speed is correspondingly reduced to 'S1'.

As described above, in accordance with this embodiment, the rotation speed of the disk 2 is made higher than the normal rotation speed thereof during only the period from time 't0' to 't1', and the amount of data stored during this period is stored in the RAM 19 having a very large storage capacity; in this case, since the data are read out from the RAM 19 at the normal speed, a time difference (extra time) can be placed between time 't2' when the disk reproduction is terminated and time 't3' when the playing is terminated. During this time difference, no data is being read from disk 2 but data stored in RAM 19 is being output. By exchanging the disk during this time difference which provides a time for standby of the playing by another disk, the playing can be continuously carried out.

Additionally, although the speed S2 of reading the data from the disk 2 has not been particularly defined in this embodiment, it can be set for up to the maximum speed which depends on the synchronization speed in the PLL circuit block 16 and the control capability of the spindle motor 1.

Now referring to FIG. 3, explanation will be given for the second embodiment of the present invention in which the disk reproduction time is very short.

Figure 3:
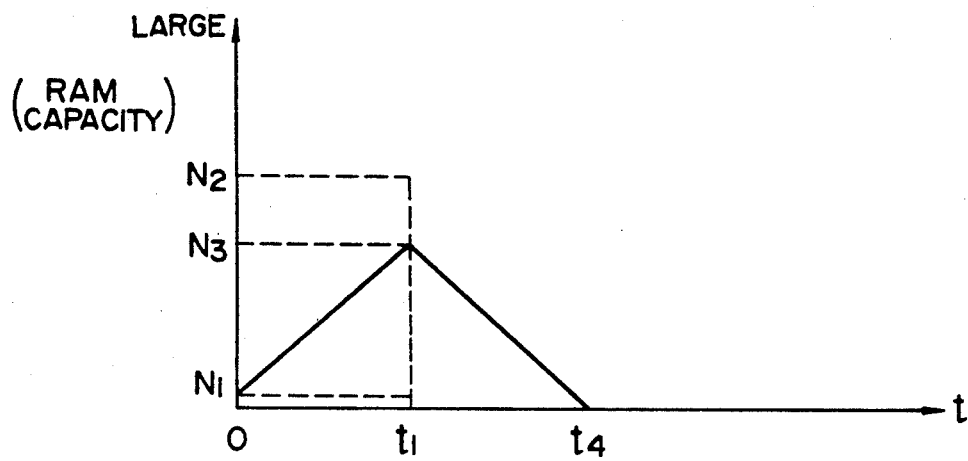
FIG. 3 is a time chart of the amount of storage in RAM in the compact disk player according to another embodiment of the present invention.

FIG. 3 shows the time change in the amount of data stored in the RAM 19 in this embodiment. As seen from FIG. 3, the data read from the disk during the period from time 't0' to time 't1' will be stored in the RAM 19 as in the first embodiment. In this case, if the disk reproduction time is short, i.e. the length of a piece of music is short, the amount of data stored in the RAM 19 at time 't1' does not reach the maximum value N2 of the storage capacity but terminates with N3 which is smaller than N2. After time 't1', the data stored in the RAM 19 will be read out to terminate the playing at time 't4'. Also in this embodiment, a time difference (extra time), although it is short, can be placed between time 't1' when the disk reproduction is terminated and time 't4' when the playing is terminated.

In the embodiments described above, the data read from the disk 2 are almost instantaneously outputted (i.e. there is a very small time difference between the starting time of disk reproduction and the time when the data are outputted). However, the data read from the disk RAM 19 without being read out therefrom during this predetermined time, and thereafter the data may be read from the RAM 19 through the signal processing circuit 8.

Further, although in the above embodiments, the compact disk player was used as an information reproduction device, the technical idea can be applied to any digital signal. Therefore, the present invention can be applied to the case where the analog signals have been A/D converted into the digital signals before they enter the apparatus according to the present invention.

Furthermore, a provision of the signal processing-/control circuit which varies the high speed of reading the data from the disk 2 in accordance with the playing time permits the difference between the reproduction completion time t2 and the playing completion time t3 to be held constant.

Likewise, a provision of the signal processing/control circuit which, in accordance with the playing time, varies the period when the data are read e.g., in FIG. 2A, data is read from disk 2 from time 0 to time t2 and in FIG. 3 data is read from disk 2 from time 0 to time t1, but not the degree of the high speed, permits the above time difference to be held constant.

The same effect can also be obtained by provision of the signal processing/control circuit which varies both components, i.e. the degree of the high speed and the period when the data are read at that high speed.

Other memory devices such as a magnetic tape, in place of the RAM used in the above embodiments, may be used.

In accordance with the present invention, digital data recorded on a recording medium are read therefrom at a speed higher than usual during a predetermined period from start of reproduction of the recording medium, the data read during that period are simultaneously stored in the RAM having a large storage capacity, and the digital data is read from the RAM at the normal speed after passage of the above period. Therefore, a time difference can be provided between the data read completion time (reproduction completion time) and data outputting completion time (playing completion time); during this the time difference, another recording medium on which digital signals have been recorded can be prepared for its reproduction. Thus, in accordance with the present invention, another playing can be smoothly enjoyed without time loss.

We claim:

1. An information reproduction apparatus, comprising:
    read means for reading information signals from an information recording medium from a data read start time to a data read completion time;
    memory means for storing said information signals read from the recording medium by said read means; and
    control means, including a reference clock generator means for generating a first predetermined frequency signal and a second predetermined frequency signal, for controlling (i) said read means to read said information signals from the recording medium at a first read speed determined by said first predetermined frequency signal during a first predetermined time period from said data read start time to a data output start time at which information signals stored in said memory means are begun to be output therefrom, (ii) said memory means to store said information signals read at said first speed during said first predetermined time period, (iii) said read means to read said information signals from the recording medium at a second read speed which is lower than said first read speed and which is determined by said second predetermined frequency signal during a second predetermined time period from said data output start time to a data output completion time at which output of information signals stored in said memory means is completed, and (iv) said memory means to store said information signals read at said second speed during said second predetermined time period, said data read completion time occurring before said data output completion time, said control means controlling output of said information signals stored in said memory means from said data output start time to said data output completion time, whereby information signals are still being output from said memory means after completion of reading of said information signals from the recording medium by said read means.

2. An information reproduction apparatus according to claim 1, wherein said control means comprises means for varying the first speed during the first predetermined time period in accordance with the length of the information to be reproduced.

3. An information reproduction apparatus according to claim 1, wherein said control means comprises means for varying said first predetermined time period in accordance with the length of the information to be reproduced.

4. An information reproduction apparatus according to claim 1, wherein said control means comprises means for varying the first predetermined time period and the first speed in accordance with the length of the information to be reproduced.

5. An information reproduction apparatus, comprising:
    read means for reading information signals from an information recording medium from a data read start time to a data read completion time;
    memory means for storing said information signals read from the recording medium by said read means; and
    control means, including a reference clock generator means for generating a first predetermined frequency signal and a second predetermined frequency signal, for controlling (i) said read means to read said information signals from the recording medium at a first read speed determined by said first predetermined frequency signal during a first predetermined time period, (ii) said memory means to store said information signals read at said first speed during said first predetermined time period, (iii) said read means to read said information signals from the recording medium at a second read speed which is lower than said first read speed and which is determined by said second predetermined frequency signal during a second predetermined time period, and (iv) said memory means to store said information signals read at said second speed during said second predetermined time period, said control means controlling output of said information signals stored in said emory means such that a data read completion time by said read means occurs before a data output completion time by said memory means, whereby information signals are still being output from said memory means after completion of reading of said information signals from the recording medium by said read means.

* * * * *